ated Jan. 25, 1972

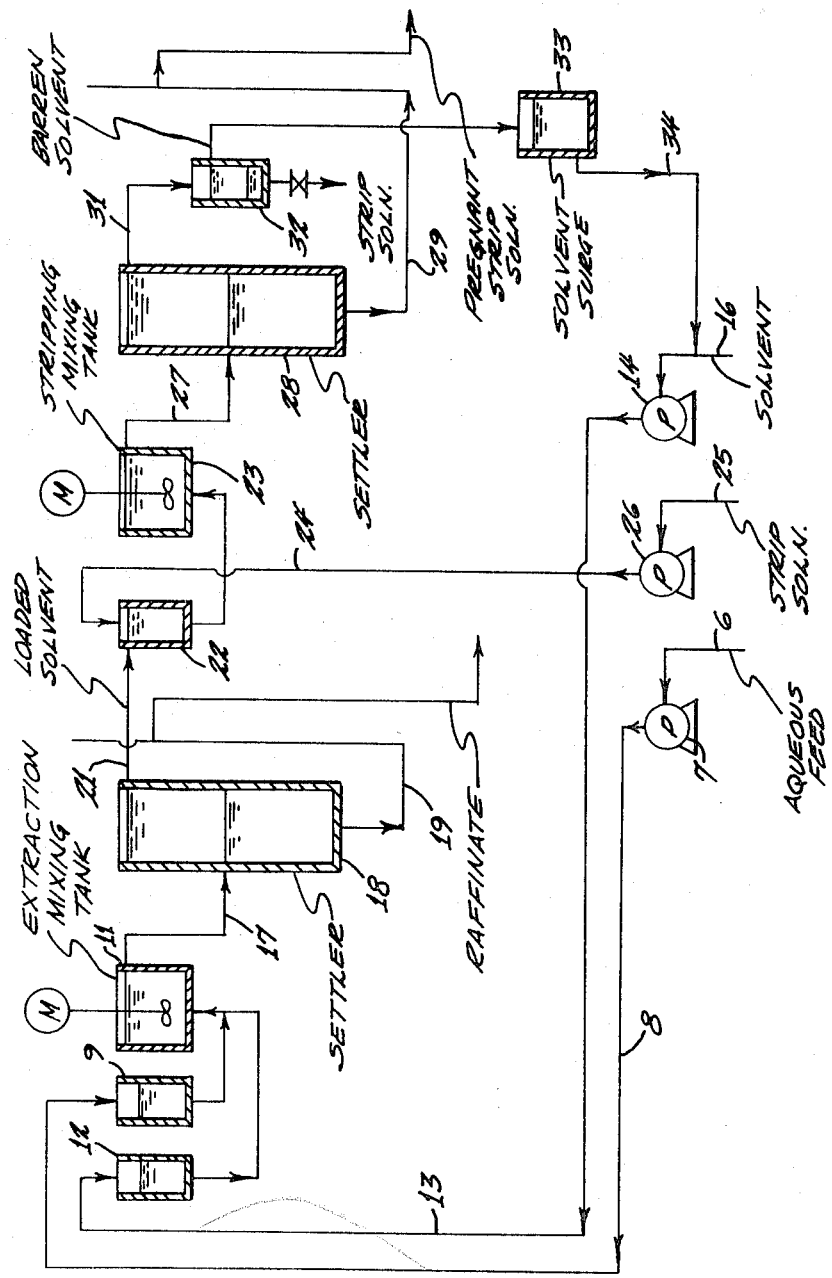

3,637,711
BETA-ALKENYL SUBSTITUTED
8-HYDROXYQUINOLINES
Walter M. Budde, Jr., Prior Lake, and James A. Hartlage, Burnsville, Minn., assignors to Ashland Oil & Refining Company, Houston, Tex.
Filed Mar. 25, 1968, Ser. No. 715,879
Int. Cl. C07d 33/38
U.S. Cl. 260—289                  4 Claims

ABSTRACT OF THE DISCLOSURE

Metal values, e.g., copper values, are recovered from aqueous solutions by solvent extraction with an organic solvent containing hydrocarbyl-substituted 8-hydroxyquinoline derivatives, such as alkylbenzyl or β-alkenyl 8-hydroxyquinolines.

This invention in one aspect relates to the recovery by solvent extraction of metal values from aqueous solutions. In another aspect, it relates to the selective recovery of copper values from dilute sulfuric acid solution by means of solvent extraction with a solvent containing a novel extraction reagent. In another aspect, it relates to certain oil-soluble 8-hydroxyquinoline compounds and their preparation.

Solvent extraction (sometimes called liquid ion exchange extraction) has been receiving increasing attention and enjoying wider use in the hydrometallurgical industry as a method for recovering metal values (or ions) from aqueous solutions. Briefly, this hydrometallurgical process comprises two steps. In the first, the extraction step, dilute aqueous feed solution, containing the metal ion to be recovered, is mixed with an immiscible hydrocarbon diluent or carrier (e.g., kerosene) containing a liquid ion exchanger or ligand dissolved therein, and the resulting metal chelate migrates to the organic phase. In the second, the stripping step, the separated "loaded" organic phase is mixed with an aqueous solution of a stripping agent (e.g., sulfuric acid) and the procedure is reversed, the metal ion passing back to the new aqueous phase. As a consequence, the dilute feed solution is converted into a highly concentrated solution, from which the metal values are more readily recovered, e.g., by electrolysis. The barren organic phase (sometimes called the solvent) is recycled through the system.

Recently, patents have issued (U.S. 3,224,873 and Belgian 676,427) and publications have appeared (see Chemical & Engineering News, Apr. 7, 1967, p. 62) disclosing the use of certain hydroxy oximes in the solvent extraction of copper values from dilute aqueous copper sulfate dump leach liquors. To date, however, no commercial plant is in operation applying this technique to the recovery of copper, though pilot-plant work is being carried out. The mining industry is watching the progress of various projects in this area, such as that involved in the development of a copper extractant known as LIX–64 (see Chemical & Engineering News, Oct. 18, 1965, p. 48, and Mar. 11, 1968, p. 44).

In a particular aspect of this invention, a class of hydrocarbyl-substituted 8-hydroxyquinoline compounds are provided which are excellent cation exchangers or extracting reagents for the recovery of metal values from aqueous solution, such as dilute copper sulfate dump leach liquor and leach liquor containing vanadium values or rare earth values. These compounds can be expressed by the general formula:

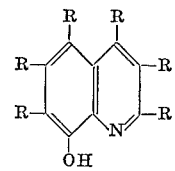

where R is hydrogen or a hydrocarbyl group such as alkyl, alkenyl, cycloaliphatic, aryl, or combination thereof (e.g., alkaryl, aralkenyl, alkylcycloalkyl, aralkyl, etc.), at least one of the Rs being such a hydrocarbyl group. The compounds of Formula I can have other substituents, as long as they do not adversely affect the solubility of the compounds of their use as extractants. 8-hydroxyquinoline (sometimes named as 8-quinolinol or oxine), the parent compound or precursor of the compounds of Formula I above, is soluble in hydrocarbon, but its metal chelates, such as copper-8-quinolinolate, are insoluble in hydrocarbons (and water). However, the compounds of Formula I and its metal chelates are soluble (or dispersible) in the hydrocarbon diluents used in solvent extraction according to this invention. The particular hydrocarbyl substituent chosen and its position with respect to the ring carbon atoms is such that the 8-hydroxyquinoline derivative will complex or chelate with the desired metal ion in the aqueous solution undergoing solvent extraction and that the said derivative and resulting metal chelate will both be soluble in the particular hydrocarbon diluent used in the extraction, for example, soluble to the extent of at least 2 wt. percent in the diluent. Generally, for this purpose, the total carbon atoms in the sum of the R groups has to be at least 8, and can be as high as 24 or more (e.g., 30), in order to achieve such solubilities. Preferably, R is an alkylbenzyl or β-alkenyl group with 12 to 18 carbon atoms. Where R is a hydrocarbyl group, it can be attached to any of the ring carbon atoms, but preferably is attached to a benzoid ring carbon atom of the Formula I (i.e., attached at the 5, 6 or 7 position). A hydrocarbyl R group of this nature can be attached to more than one of the ring carbon atoms, though such generally will not be necessary to achieve oil-solubility of the metal chelates of the compounds of Formula I. Preferably, for best use of these compounds as extractants, the hydrocarbyl R group will be attached at the 7-position and it will be an alkylbenzyl or, more preferably, a β-alkenyl group (preferably methyl-branched) such as dodecenyl, these preferred compounds having the general formulas:

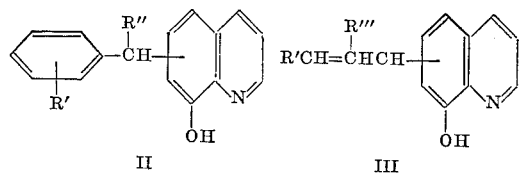

where R′, R″, and R‴ are alkyl, aryl, or hydrogen, with the proviso that the total carbon atoms in the sum of these substituents be at least sufficient to ensure that the metal chelates of these compounds are also soluble in hydrocarbon. For this purpose, in the case of Formula II, it is desired that the total of carbon atoms in the sum of R' and R" be at least one, and preferably at least 2, and with the proviso in the case of compounds of Formula II that the total of carbon atoms in the sum of R' and R'" be at least 5, and preferably at least 8. In Formula II, R' is preferably alkyl of 5 to 14 carbon atoms and R" is preferably hydrogen; in Formula III, R' is preferably hydrogen and R'" is preferably an alkyl (especially one with 1–5 methyl branches) of 5 to 14 carbon atoms. These preferred compounds will be easier and/or cheaper to synthesize. The compound which we have found to be the most useful in the solvent extraction of copper is 7-[3-(5,5,7,7-tetramethyl-1-octenyl)]-8-hydroxyquinoline, a β-alkenyl derivative of 8-hydroxyquinoline which has the structure:

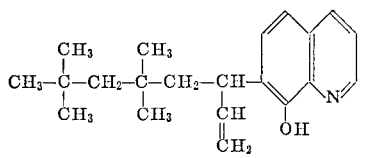

IV

The compound of Formula IV is made by reacting 8-hydroxyquinoline (sodium salt) with dodecenyl chloride and distilling the resulting alkenyl ether, as described in detail hereinafter in the working examples, the dodecenyl chloride being 1-chloro-5,5,7,7-tetramethyl-2-octene.

When the above 8-hydroxyquinoline derivatives of Formula I are used in the solvent extraction of metal ions, chelates or complexes (metal hydroxyquinolates) represented as follows are formed:

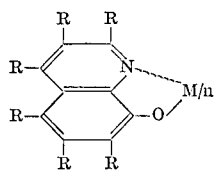

V where M is the chelated metal ion and n is the valence of the metal ion. When the preferred compounds of Formula III are used in the solvent extraction of copper, chelates or complexes represented as followed are formed:

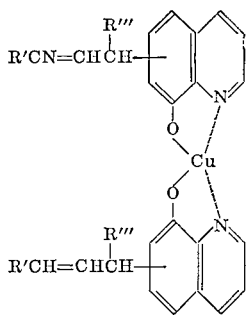

VI

Representative compounds useful in this invention and within the scope of the above general Formula I are:

7-octylbenzyl-8-hydroxyquinoline,
7-dodecylbenzyl-8-hydroxyquinoline,
7-nonylbenzyl-8-hydroxyquinoline,
7-ditertiarybutylbenzyl-8-hydroxyquinoline,
7-hexadecyl-8-hydroxyquinoline,
7-octadecyl-8-hydroxyquinoline,
7-hexadecenyl-8-hydroxyquinoline,
7-dibenzyl-8-hydroxyquinoline,
7-dimethyldicyclopentadienyl-8-hydroxyquinoline,
7-dicyclopentadienyl-8-hydroxyquinoline,
7-dodecylphenyl-8-hydroxyquinoline,
7-phenyldodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The oil-soluble alkylbenzyl-8-hydroxyquinolines (Formula II) of this invention can be prepared in a manner in some respects similar to that of U.S. Pat. No. 2,649,451 by reacting 8-hydroxyquinoline with a compound of the general formula R'—φ—CH(R")X, where R' and R" are as defined above, φ is a divalent benzoid ring, and X is a halide such as chlorine, bromine or iodine. The two reactants are preferably used in equimolecular amounts, but either one can be used in excess. Similarly, the β-alkenyl-8-hydroxyquinolines (Formula III) can be prepared by reacting 8-hydroxyquinoline with a compound of the general formula R'CH=CHCH(R'")X, where R', R'" and X are as defined above. Compounds of this type which are especially preferred are those alkenyl halides disclosed in U.S. Pat. No. 2,689,873. The reaction of 8-hydroxyquinoline with either of these "alkylating" agents is preferably carried out in a solvent in the presence of sufficient alkali to form the sodium or potassium salt of 8-hydroxyquinoline. (Alternatively, the hydroxyquinoline reactant can be charged initially as its sodium or potassium salt.) The solvent can be a normally liquid aliphatic or aromatic hydrocarbon or halogenated derivatives thereof, such as benzene, toluene, xylene, naphtha, isoparaffin, carbon tetrachloride, etc., or a polar solvent which is less acidic than 8-hydroxyquinoline, such as methanol, dimethylformamide, sulfolane, and dimethyl sulfoxide. Alkali such as postassium or sodium hydroxide or sodium methoxide can be used in conjunction with either type of solvent. The reaction is exothermic and can be promoted with supplemental heat, e.g., to maintain the reaction temperature at 25–300° C., preferably 120–150° C., and can be continued at atmospheric pressure until a homogenous dark product results, or until the alkali is all used up. At completion of the reaction, the salt produced can be washed out with water. The separated water-insoluble product can be fractionally distilled to yield an oil-soluble 8-hydroxyquinoline. Where the reaction solvent is a polar solvent and the alkylating agent has said formula

R'CH=CHCH(R")X the product resulting from the water washing step must be distilled in order to convert, at the distillation temperature, the intermediate alkenyl ether to the oil-soluble product.

Representative reagents which can be reacted with the 8-hydroxyquinoline to prepare the oil-soluble compounds of this invention include: ethylbenzyl chloride, octylbenzyl chloride, dodecylbenzyl chloride, nonylbenzyl chloride, ditertiary butylbenzyl chloride, octylbenzyl chloride, octenyl chloride, hexadecenyl chloride, dodecenyl chloride, chloromethyl durene, chloromethyl mesitylene, and the like.

Other than the nature of the extraction agent of this invention (i.e., the oil-soluble 8-hydroxyquinoline), the solvent extraction of metal values from aqueous solutions is carried out manipulative-wise in a conventional manner. Briefly, this entails dissolving the extraction agent in a normally liquid hydrocarbon solvent which is water-immiscible. These solvents can be aliphatic or aromatic or alkyl aromatic hydrocarbons or chlorinated hydrocarbons, such as those derived from petroleum, these solvents generally having specific gravities in the range of 0.65 to 0.95 and mid-boiling points in the range of 120 to 615° F. (ASTM Distillation). Representative solvents which can be used in this invention include benzene, toluene, xylene, Hi-Sol or Sacosol (aromatic hydrocarbon), Skellysolve B (hexane-heptane mixture), fuel oil, kerosene, and other hydrocarbons. The extraction agents of this invention and the metal complexes thereof resulting from the solvent extraction are soluble (or dispersible) in the hydrocarbon solvent used. Simple solubility tests can be made to determine which solvent will be best for a particular extracting agent. The concentration of the extraction agent in the solvent can vary and generally will be 2–50 weight percent, preferably 1 to 15 weight percent, of the resulting solution. The extractive power or selectivity of the extractant, or the phase separation of the organic phase from the aqueous phase, can be improved in some instances by adding to the organic solution a modifier or conditioner, such as isodecanol or other aliphatic alcohols known in the art (see U.S. Pat. No. 3,224,873), such modifiers, where used, amounting to 0.5 to 10 weight percent of the resulting modified solution.

In the accompanying drawing, a solvent extraction flow sheet is shown illustrating the solvent extraction aspect of this invention. It will be described now as applied to the solvent extraction of copper values ($Cu^{++}$) from dump leach liquor (aqueous copper sulfate) using a kerosene solution of 5 weight percent 7-dodecenyl-8-hydroxyquinoline (see Formula IV).

A dump leach liquor feed 6, containing 6.13 g./l. copper values and 6.50 g./l. $H_2SO_4$, is continuously pumped by metering pump 7 at a rate of 28 cc./min. to a hold-tank 9 and it is mixed in mixing tank 11 with solvent from hold-tank 12 supplied thereto by metering pump 14 at a rate of 32 cc./min., this solvent containing 0.7 g./l. of Cu, 22 g./l. dissolved $H_2SO_4$. The resulting mixture 17 of organic and aqueous phases overflows to a settler 18, where separation of the two phases occurs, raffinate 19 containing 1.8 g./l. of Cu and 32 g./l. of $H_2SO_4$ being withdrawn from the bottom of the settler and loaded solvent 21 containing 4.9 g./l. of Cu (and nil $H_2SO_4$) overflowing to a hold tank 22. From the latter, the loaded solvent is passed to a mixing tank 23 in admixture with sulfuric acid stripping agent 24 containing 150 g./l. of $H_2SO_4$ and 25 g./l. of Cu, which is continuously supplied by metering pump 26 at 28 cc./min. The mixture 27 of loaded solvent and stripping agent overflows tank 23 to a settler 28 where separation of the organic and aqueous phase occurs. Pregnant strip solution 29 containing 29.2 g./l. of Cu and 150 g./l. of $H_2SO_4$ is withdrawn from the bottom of stripper 28 and passed to a conventional electrolysis unit (not shown) where the copper is plated out of the aqueous solution. Barren solvent 31 containing 0.7 g./l. of Cu overflows from the top of settler 28 and is passed to hold-tank 32, from which it then flows to a surge tank 33 and thence is recycled.

Although only a single mixing tank and settler are shown in the drawing in each of the extraction and stripping operations, a plurality of such equipment can be employed in series in each operation. Such details are omitted in the interest of brevity, and reference is made to Bulletin Nos. T4–B32 and A1–B6 of the Denver Equipment Company for descriptions of mixer-settler systems which can be used and for a description of solvent extraction principles and techniques, such bulletins being incorporated herein by reference. Such equipment is also described in U.S. Pat. No. 3,206,288. Alternatively, centrifugal solvent extractors can be used, such as described in Brochures P–100 and PD–763 of Podbielnak, Inc.

The solvent extraction aspect of this invention can be carried out on a multi-stage or single-stage batch or continuous basis, and applied to the recovery of any of the metal values known for analytical purposes to form complexes or chelates with 8-hydroxyquinoline (see Textbook of Quantitative Inorganic Analysis by Kolthoff and Sandell, published by the Macmillan Co., N.Y., 1952). Such metals include copper, aluminum, antimony, bismuth, cadmium, calcium, cerium, cesium, chromium, cobalt, gallium, indium, iron, lead, magnesium, manganese, molybdenum, nickel, palladium, scandium, thallium, thorium, titanium, tunsten, uranium, vanadium, zinc, and zirconium. The metal chelates or complexes of this invention are soluble or dispersible in the hydrocarbon solvent used in the extraction. The extracting agents and their metal chelates are stable and their hydrocarbon solutions have very good phase separation and stripping characteristics, carried out over a wide range of pH, e.g., 1–7. The invention is particularly applicable to the recovery of copper values from dump leach liquor containing iron values in addition to copper values, the latter being preferentially or selectively extracted into the organic phase. Such liquors generally will have a pH of 1.7 to 3 and will contain from 1 to 10 g./l. of $Cu^{++}$ and from 1 to 10 g./l. of $Fe^{+++}$. The extracting agents of this invention have high loading capacity for copper (e.g., 8–9 g./l. or higher) and the ability to extract copper preferentially over iron at the low pHs normally encountered in dump leach liquors (or even lower, e.g., 0.5–1.5) without necessitating adjustment of pH to obtain optimum extraction of the copper. Where other metals are to be extracted, the pH of the feed can be adjusted if desired to obtain the desired selectivity or extraction. Although dilute sulfuric acid (generally containing from 50 to 300 g./l. of $H_2SO_4$) is the preferred stripping agent, other mineral acid stripping agents can be used, such as dilute (or strong) hydrochloric acid. Alternatively, the metal values can be recovered from the loaded solvent by hydrogenating the latter. Other methods for recovery of the metal values from the loaded solvent can be used, such as disclosed in U.S. 3,224,873.

The objects and advantages of this invention are further illustrated in the following examples, but it should be understood that the various materials used and amounts thereof, and the conditions of reaction and treatment described therein, should not be construed to unduly limit this invention.

EXAMPLE I

Into a 1-liter, round-bottom, 3-neck flask equipped with a stirrer, dropping funnel and thermometer, were placed 148 g. of 8-hydroxyquinoline, 500 ml. of dimethylformamide, and a solution of 150 g. of methanol and 66 g. of potassium hydroxide. The reaction mixture was heated to 35° C. and then 202 g. of dodecenyl chloride were added to the reaction flask and the mixture stirred for about 16 hrs. at 35–40° C. The reaction mixture was poured into water, separated and washed with water, and vacuum distilled to produce 222 g. (71.6% yield) of a straw-colored liquid product identified by nuclear magnetic reasonance and elemental analyses as a 7-[3-(5,5,7,7-tetramethyl-1-octenyl)]-8-hydroxyquinoline product.

In a similar manner, the same product was made (64.5% yield) using methanol instead of dimethylformamide, a reaction temperature of 70° C. (the reflux temperature of the reaction mixture), and a reaction time of 3 hrs.

In another run, again using methanol as the reaction solvent, 8-hydroxyquinoline was alkylated with octenyl chloride (5,5-dimethyl-2-hexenyl chloride) to produce 7-[3-(5,5-dimethyl-1-hexenyl)]-8-hydroxyquinoline.

EXAMPLE II

Into a flask like that described in Example I were placed 197 g. of sodium 8-quinolinolate, and 241 g. of dodecenyl chloride. The resulting slurry was stirred and heated to 115° C., after which 100 ml. of dry toluene were added and the reaction temperature was maintained at 115° C. for ½ hr. The reaction mixture quickly became homogenous and 200 ml. of further dry toluene were added and the mixture maintained at reflux for 3 hrs. The resulting dark brown oil product was poured into water, separated, washed with water, and stripped of toluene on a rotary evaporator, leaving 361 g. (91% yield) of oil. This oil was vacuum distilled to give a waxy solid product (75% yield) which was identified by nuclear magnetic reasonance and elemental analyses as 7-[1-(5,5,7,7-tetramethyl-2-octenyl)]-8-hydroxyquinoline product.

EXAMPLE III

Into a flask like that described in Example I were placed a dispersion of 28 g. of sodium hydride in 100 ml. of dry toluene. This dispersion was stirred while a solution of 100 g. of 8-hydroxyquinoline in 800 ml. of dry toluene were slowly added. The resulting slurry was refluxed (ca. 115° C.) for 1 hr. and then 140 g. of dodecenyl chloride were slowly dropped into the flask. The reaction mixture was refluxed 6 hrs., poured into water, separated and washed with 5% sulfuric acid. The washed organic layer was stripped of toluene on a rotary evaporator, leaving 195 g. (90% yield) of tan oil. The latter was vacuum distilled to produce 152 g. (82% distillation yield) of a waxy solid identified by infra red, nuclear magnetic reasonance, and elemental analyses as 7-[1-(5,5,7,7-tetramethyl-2-octenyl)]-8-hydroxyquinoline product.

EXAMPLE IV

Into a flask like that described in Example I were placed 200 g. of sodium 8-quinolinolate and 388 g. of dodecylbenzyl chloride. The mixture was stirred and heated to 120° C. The reaction quickly became exothermic, reaching 190° C. in 10 min. The reaction mixture was cooled, poured into 1 liter of benzene to give an organic solution which was then washed with 5% sulfuric acid and then washed 3 times with water. The benzene was stripped out with a rotary evaporator, leaving a dark oil which was molecularly distilled to produce 263 g. (73.8% yield) of a straw-colored liquid identified by elemental and infra red anlyses as dodecylbenzyl-8-hydroxyquinoline.

In a similar manner, nonylbenzyl-8-hydroxyquinoline was prepared by alkylating sodium 8-quinolinolate with nonylbenzyl chloride.

EXAMPLE V

A 10 wt. percent toluene solution of the dodecenyl-8-hydroxyquinoline product of Example III was shaken in a separatory funnel at room temperature for about 2 min. with an equal volume of an aqueous copper sulfate feed solution containing 5.7 g./l. of $Cu^{++}$ and having a pH of 2.0. The two phases were allowed to separate and the aqueous phase (raffinate) was iodometrically titrated for residual copper and its pH also determined. The loaded extraction solvent was again contacted with another equal volume of the copper sulfate feed solution and the raffinate again analyzed. Third and fourth contacts were made in a like manner. In Table I below, the results of this extraction are set forth.

TABLE I

| Extraction No. | pH of raffinate | $Cu^{++}$ in raffinate, g./l. | $Cu^{++}$ in loaded solvent*, g./l. |
|---|---|---|---|
| 1 | 1.1 | 0.25 | 5.45 |
| 2 | 1.1 | 3.10 | 8.05 |
| 3 | 1.7 | 5.20 | 8.55 |
| 4 | 2.0 | 5.60 | 8.65 |

*Determined by difference.

The above data show that the dodecenyl-8-hydroxyquinoline reagent of this invention has the ability to extract copper at low pH and this reagent has an exceptionally high copper loading capacity.

EXAMPLE VI

A 5 wt. percent kerosene solution of the dodecenyl-8-hydroxyquinoline product of Example III was contacted with an equal volume of an aqueous feed solution having a pH of 1.5 and containing 6.5 g./l. of $Zn^{++}$. Analysis of the raffinate showed that no significant amount of zinc was extracted. Similarly, no significant zinc was extracted when the feed solution had a pH of 3.0. However, when the feed solution had a pH of 4.6 13% of the zinc in that solution was extracted. These data show that the reagent does have the ability to extract zinc, albeit the pH of the feed solution must be greater than 3.

EXAMPLE VII

Ten wt. percent kerosene solutions of the dodecenyl-8-hydroxyquinoline product of Example III were contacted with equal volumes of aqueous feed solution containing 2.1 g./l. of $Cd^{++}$. In Table II below are listed the results.

TABLE II

| Extraction No. | pH of aqueous feed | $Cd^{++}$ i raffinate, g./l. |
|---|---|---|
| 1 | 6.6 | 0.19 |
| 2 | 5.1 | 0.22 |
| 3 | 3.0 | 0.36 |
| 4 | 2.0 | 2.00 |

These data show that the extraction agent of this invention is also useful in the recovery of cadmium.

EXAMPLE VIII

One volume of a 10 wt. percent toluene solution like that of Example V was used to extract two volumes of an aqueous feed solution containing 4.65 g./l. of $Cu^{++}$ as copper sulfate and 2.33 g./l. of $Fe^{+++}$ as ferric sulfate and having a pH of 2.0. Analysis of the resulting raffinate showed it to contain 1.2 g./l. of $Cu^{++}$ and 2.09 g./l. of $Fe^{+++}$. The selectivity ratio for this extraction of copper with respect to iron calculated from this data was 20, a value which shows the reagent is highly selective for cupric copper in the presence of ferric iron at low pH.

EXAMPLE IX

The utility of the dodecenyl-8-hydroxyquinoline product of Example III to extract $Cu^{++}$ in a continuous solvent extraction system is exemplified in this example. The system comprised one extraction stage and one stripping stage, each of these stages having a mixer of 200 cc. in volume and a settler with an area of 2.4 sq. in. The continuous operation was run for 120 cycles for a total of 180 hrs. (a cycle being one extraction stage followed by one stripping stage, with recycle of the stripped solvent to the extraction stage of the next cycle). The phase ratio of organic to aqueous during the run was about 1:1. The aqueous copper sulfate feed solution contained 6.03 g./l. of $Cu^{++}$ and 6.1 g./l. of sulfuric acid. The solvent used for the first 80 cycles contained 10 wt. percent of the reagent in a mixture of 80 parts of Sacosol 150 and 20 parts of isodecanol, and in the last 40 cycles the solvent was diluted with this mixture to 6% reagent. The stripping solution used contained 200 g./l. of sulfuric acid and 35 g./l. of $Cu^{++}$, and the barren (i.e., stripped) solvent was maintained between 0.7 to 0.9 g./l. of $Cu^{++}$. The system was operated with the extraction stage at ambient temperature and the stripping stage a 50–55° C. The feed and strip solutions were fed to the system with adjustable metering pumps from individual makeup tanks. The resultant raffinate and pregnant strip solutions were discharged into holding tanks, sampled, and then discarded.

During the run, the loading capacity of the solvent was periodically determined from analysis of the copper in the loaded solvent. It was found that the loading capacity of the solvent at the start of the operation was 8.31 g./l. of $Cu^{++}$; a the end of the first 80 cycles, it was 8.27 g./l.; at the start of the last 40 cycles, it was 5.45; and at the end of the operation it was 5.46. Thus, the loading capacity throughout the run was substantially constant, establishing the chemical stability of the reagent. The extraction stage operated well, with rapid phase disengagement and no separation band in the settler. There was no evidence of sludge or precipitate accumulation in any part of the circuit and, in general, the physical behavoir of the system was good.

The oil-soluble 8-hydroxyquinoline metal chelates or complexes described above, particularly the copper chelate, e.g., of 7-dodecenyl-8-hydroxyquinoline, can be used in a manner like other so-called solubilized copper-8-hydroxyquinolines (see U.S. Pat. Nos. 2,457,025, 2,756,175, 2,769,006, and 3,033,865) as a fungicide to control rot or mildew in textile, leather, paper, etc., using the chelate for this purpose as a solution in the above-described hydrocarbon solvents.

Various modifications and alterations of this invention will become obvious to those skilled in the art without departing from the scope and spirit of this invention, and it should be understood that this invention should not be unduly limited to that set forth herein for illustrative purposes.

We claim:
1. A compound of the formula:

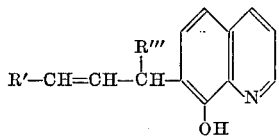

wherein R' is hydrogen and R''' is alkyl having from 5 to 14 carbon atoms.

2. 7-[3(5,5,7,7-tetramethyl-1-octenyl)]-8-hydroxyquinoline.
3. 7-[3-(5,5-dimethyl-1-hexenyl)]-8-hydroxyquinoline.
4. 7 - [1 - (5,5,7,7-tetramethyl-2-octenyl)]-8-hydroxyquinoline.

References Cited

UNITED STATES PATENTS

| 2,178,571 | 11/1939 | Flett | 260—289 X |
| 2,387,591 | 10/1945 | Kolb | 260—289 X |
| 2,483,838 | 10/1949 | Niederl | 260—289 X |
| 2,649,451 | 8/1953 | Wheatley | 260—289 X |
| 2,689,873 | 9/1954 | Niederhauser | 260—654 |
| 2,703,324 | 3/1955 | Binkley | 260—289 X |
| 2,745,832 | 3/1956 | Fath | 260—288 X |
| 3,107,261 | 10/1963 | Gerber | 260—453 |

OTHER REFERENCES

Pene et al., Abstracted in Chem. Abstr. vol. 64, col. 19580-1 (1966).

Pene et al., Bull. Soc. Chim. France, vol. 1966, pp. 586-94.

DONALD G. DAUS, Primary Examiner

U.S. Cl. X.R.

75—117; 260—270, 651